US006729197B2

(12) United States Patent
Adcock

(10) Patent No.: US 6,729,197 B2
(45) Date of Patent: May 4, 2004

(54) GYROSCOPIC TORQUE CONVERTER

(76) Inventor: Willis A. Adcock, 3414 Mount Bonnell Dr., Austin, TX (US) 78731

( * ) Notice: Subject to any disclaimer, the term of this patent is extended or adjusted under 35 U.S.C. 154(b) by 0 days.

(21) Appl. No.: 10/051,850

(22) Filed: Jan. 17, 2002

(65) Prior Publication Data
US 2003/0159532 A1 Aug. 28, 2003

Related U.S. Application Data

(63) Continuation-in-part of application No. 09/858,022, filed on May 15, 2001, now Pat. No. 6,571,652.

(51) Int. Cl.[7] .............................................. G01C 19/34
(52) U.S. Cl. ............................................. 74/5.9; 74/5.7
(58) Field of Search ........................... 74/5 R, 5.7, 5.9, 74/64, 112, 126

(56) References Cited

U.S. PATENT DOCUMENTS

| 1,452,483 | A | * | 4/1923 | Sperry | .................. 74/5 R |
| 1,992,457 | A |   | 2/1935 | Anderson, Jr. | |
| 2,219,964 | A | * | 10/1940 | Roland et al. | .............. 74/5.9 X |
| 2,639,631 | A |   | 5/1953 | Taylor | |
| 2,819,053 | A | * | 1/1958 | Pope | ........................... 74/5 X |
| 2,850,905 | A | * | 9/1958 | Sedgfield | ..................... 74/5 X |
| 3,597,598 | A | * | 8/1971 | McAllister et al. | ...... 74/5.34 X |
| 4,267,737 | A | * | 5/1981 | O'Connor et al. | ......... 74/5.9 X |
| 4,558,604 | A | * | 12/1985 | Auer | ........................ 74/5.9 X |
| 4,838,099 | A | * | 6/1989 | Quermann | ................ 74/5.9 X |
| 5,655,412 | A | * | 8/1997 | Luik | ........................ 74/5.34 X |

FOREIGN PATENT DOCUMENTS

| GB | 2225424 | * | 5/1990 | .................. 74/5 X |
| JP | 401193612 | * | 8/1989 | .................. 74/5 X |

* cited by examiner

Primary Examiner—Ha Ho
(74) Attorney, Agent, or Firm—Haynes and Boone, LLP

(57) ABSTRACT

A gyro torque converter includes an input shaft and an output shaft. The input shaft is fixedly connected to rotate a first drive member. A gimbal is supported by the input shaft. A second drive member is driven by the first drive member. A first shaft is driven by the second drive member. A drive unit is mounted on the first shaft. A second shaft extends from the drive unit. A plurality of gyro members are rotatably mounted on the second shaft.

14 Claims, 4 Drawing Sheets

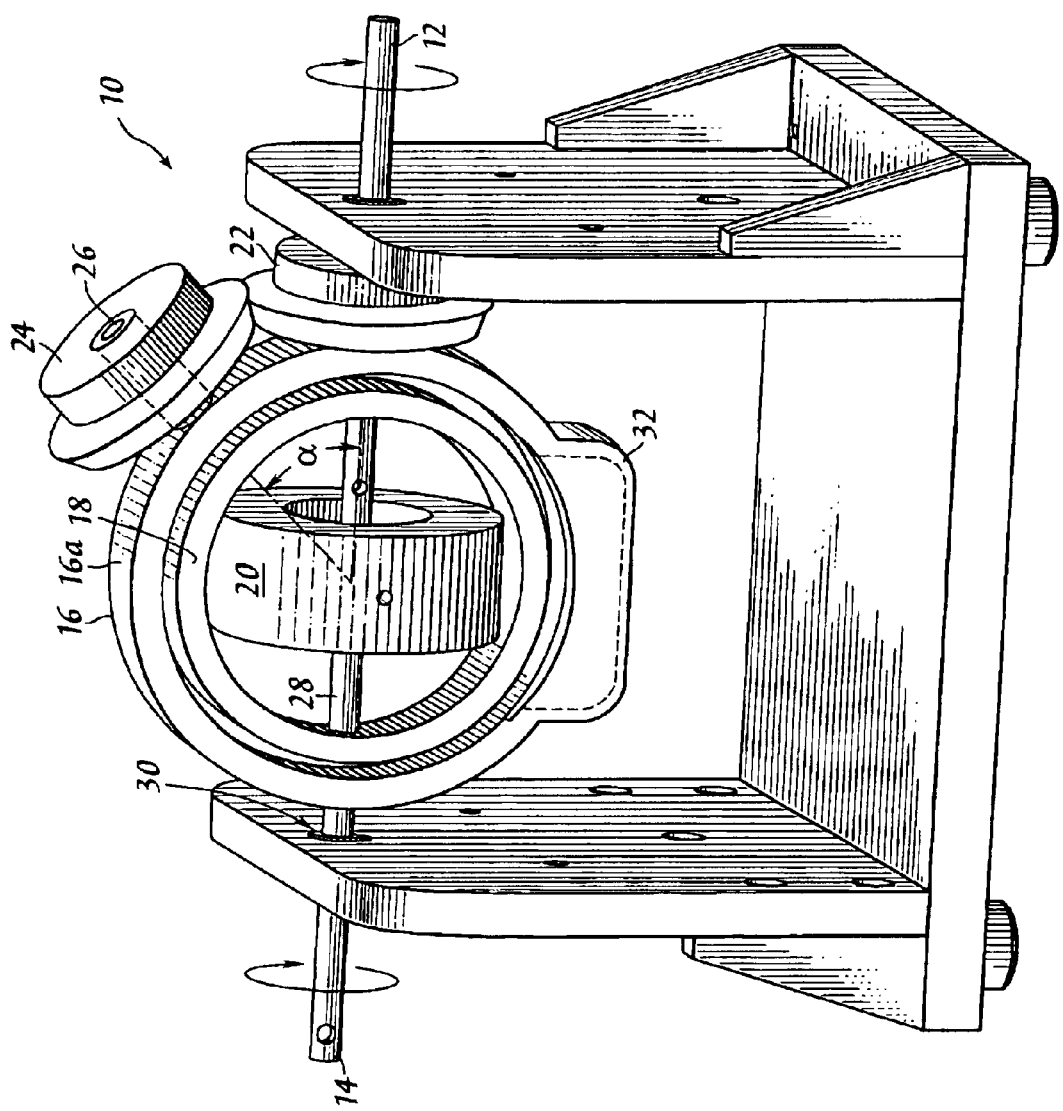

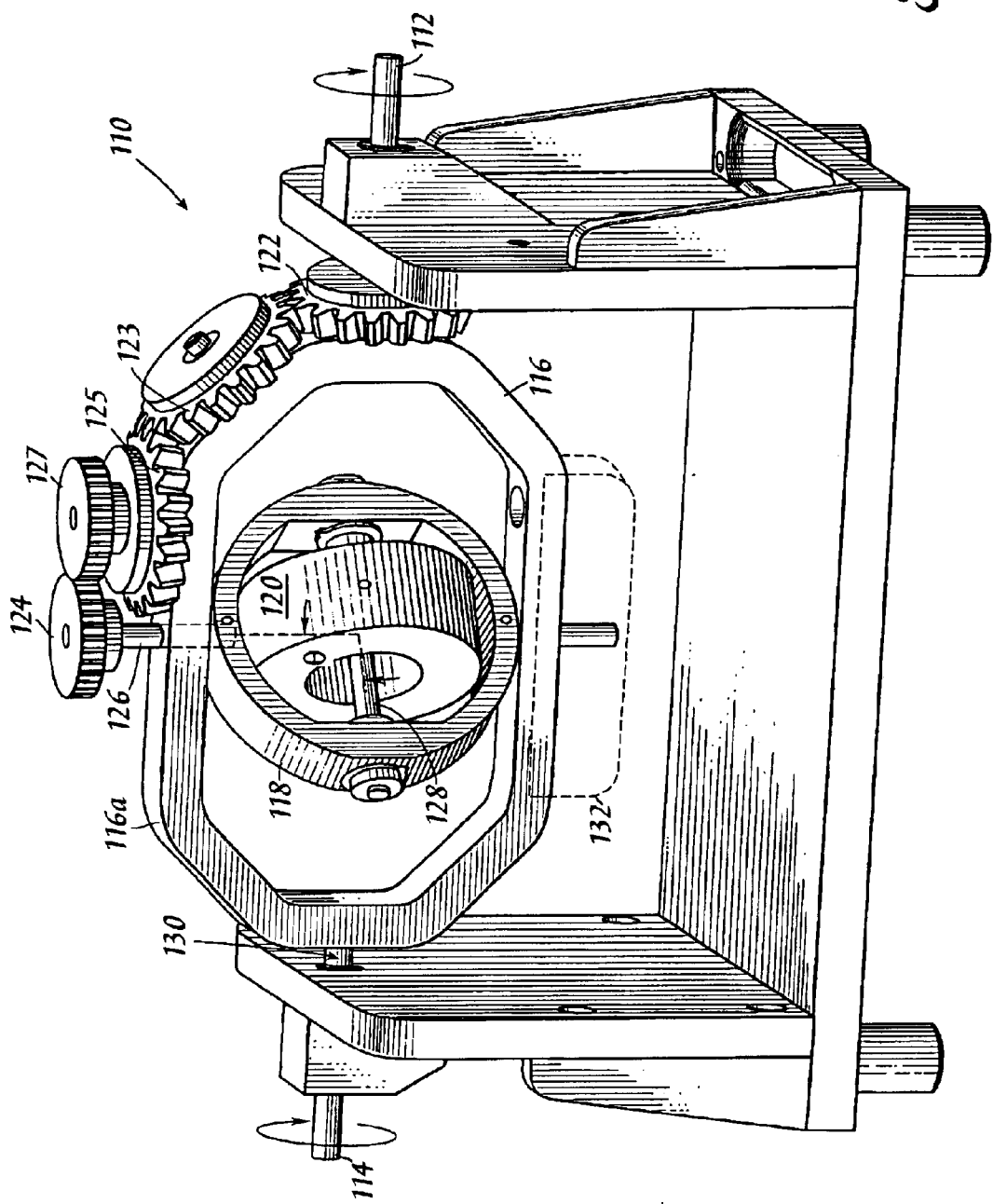

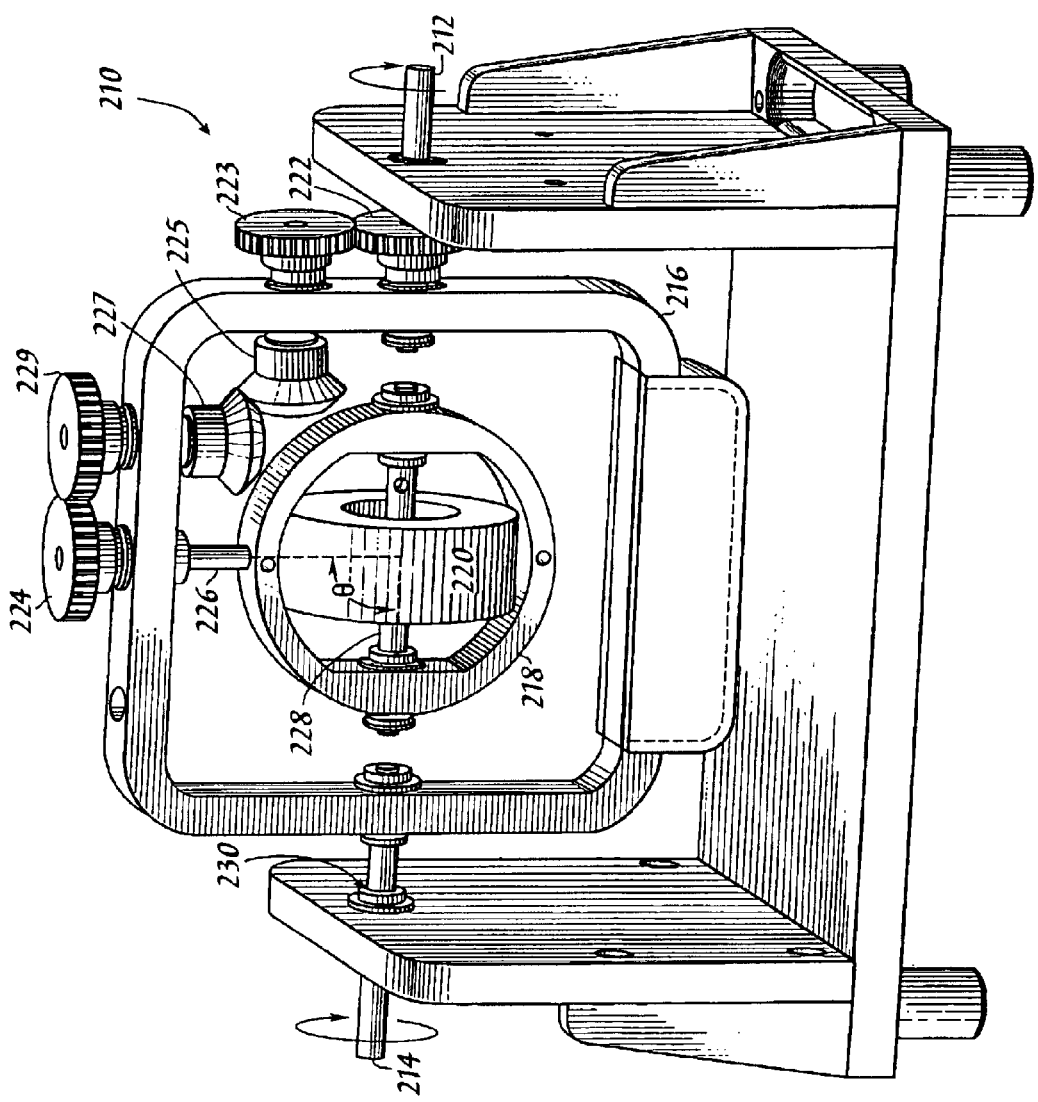

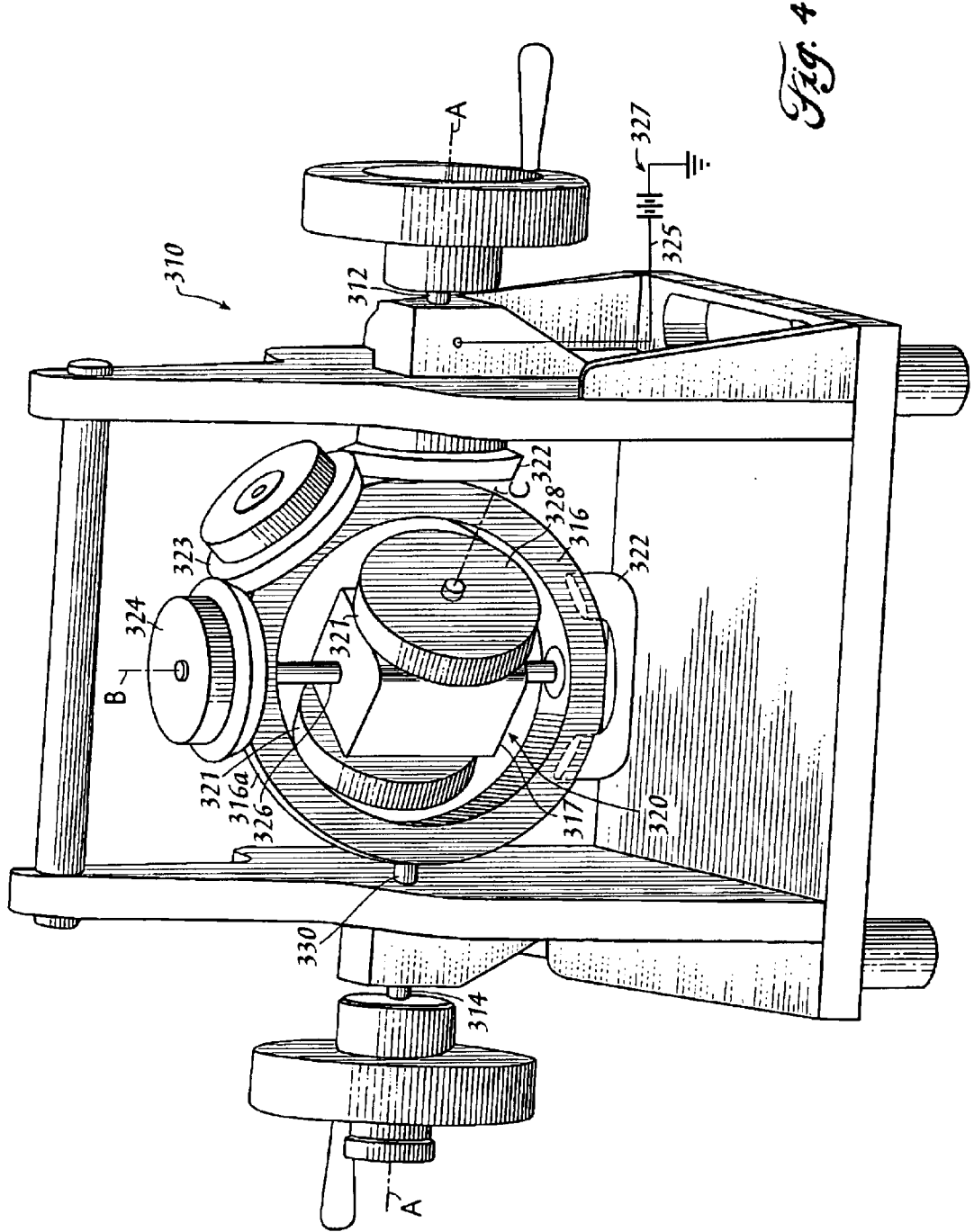

GYROSCOPIC TORQUE CONVERTER

This application is a continuation-in-part of U.S. patent application Ser. No. 09/858,022, filed on May 15, 2001 now U.S. Pat. No. 6,571,652, by Willis A. Adcock, entitled GYROSCOPIC TORQUE CONVERTER.

BACKGROUND

The disclosures herein relate generally to power transmission and more particularly to a gyroscopic torque converter.

Many attempts have been made to provide an efficient mechanical power transmission device that can successfully be used between a constant speed power source and a variable speed load for appreciable magnitudes of power. Most of those devices have been faced with the same problem, namely, after a spinning flywheel has been precessed 180□, there is a change in direction of the gyroscopic torque that is developed. Previous devices have attempted to overcome this reversal by allowing the gyroscope flywheel to turn about four axes, namely, the spin axis, the precession axis, the power axis, and a fourth axis which keeps the output torque unidirectional. This leads to a complex mechanism which cannot practically deliver appreciable power in a machine of usable size. Furthermore, this complexity leads to a prohibitive manufacturing cost.

U.S. Pat. No. 1,992,457, discloses a torque converter in which a spinning gyroscope is given a unidirectional input precession motion and which will produce a unidirectional resultant torque on an ultimately driven member varying within a wide range of values according to the resisting load on the ultimately driven member, and in which the resultant output precession movements of the gyroscope take place about the axis of the ultimately driven member.

U.S. Pat. No. 2,639,631, discloses a torque converter which utilizes the gyroscopic torque by decreasing the flywheel spin speed during the portion of the precession cycle when the direction of the developed torque is opposite to the desired direction. Hence, a number of flywheels, each producing an oscillating torque which is greater in one direction, can be combined to produce a constant unidirectional torque.

Therefore, what is needed is a torque converter device which overcomes the problems associated with previous devices and which is not overly complex or costly.

SUMMARY

One embodiment, accordingly, provides a torque converter which provides an efficient mechanical power transmission device that can be used between a constant speed power source and a variable speed load for appreciable magnitudes of power. To this end, a gyro torque converter includes input shaft and an output shaft. A gimbal is supported by the input shaft and the output shaft. A first shaft is rotatably mounted to extend through the gimbal and is connected to be driven by the input shaft. A gyro is mounted on the first shaft and on a second shaft.

A principal advantage of this embodiment is that the torque converter device avoids the problems associated with prior devices without undue mechanical complexity or cost.

BRIEF DESCRIPTION OF THE DRAWINGS

FIG. 1 is an isometric view illustrating an embodiment of a gyroscopic torque converter.

FIG. 2 is an isometric view illustrating another embodiment of a gyroscopic torque converter.

FIG. 3 is an isometric view illustrating a further embodiment of a gyroscopic torque converter.

FIG. 4 is an isometric view illustrating another embodiment of a gyroscopic torque converter.

DETAILED DESCRIPTION

In FIG. 1, a gyro torque converter is designated 10 and includes an input shaft 12 and an output shaft 14. An outer gimbal 16 is supported by the input shaft 12 and the output shaft 14. An inner gimbal 18 is rotatably mounted within the outer gimbal 16. The inner gimbal is connected to be rotatably driven by the input shaft 12. A gyro 20 is rotatably mounted within the inner gimbal 18.

A first drive member 22 is connected to rotate with the input shaft 12, and a second drive member 24 is rotatably driven by the first drive member 22. In this embodiment, the first and second drive members 22, 24, respectively, are a pair of meshed gears, however it is recognized that other first and second drive members can be interconnected by a drive belt (not shown).

A first shaft 26 is connected to the second drive member 24 and to the inner gimbal 18 for rotating the inner gimbal 18. A second shaft 28 is mounted in the inner gimbal 18 for supporting the gyro 20. The first shaft 26 is positioned at an angle ∝ relative to the second shaft 28. The angle ∝ is less than 90 degrees.

A roller clutch 30 is mounted on the output shaft 14 so that the outer gimbal 16 is rotatable in only one direction. Roller clutch 30 is a commercially available device and can be purchased from Berg Manufacturing.

The second drive member 24 is mounted on an outer peripheral surface 16a of outer gimbal 16. Also, a counterbalance member 32 is mounted on the outer gimbal 16 and positioned substantially opposite the second drive member 24 to counter the weight of the second drive member 24.

In FIG. 2, a gyro torque converter 110 includes an input shaft 112 fixedly connected to rotate a first drive member 122. An outer gimbal 116 is supported by the input shaft 112. A second drive member 124 is driven by the first drive member 122. An inner gimbal 118 is mounted within the outer gimbal 116. A gyro 120 is rotatably mounted within the inner gimbal 118 and an output shaft 114 is connected to rotate with the outer gimbal 116.

An intermediate drive means interconnects the first drive member 122 and the second drive member 124. The intermediate drive means includes a plurality of gears 123, 125, 127 meshed between the first drive member 122 and the second drive member 124. It is recognized that other drive members can be interconnected by a drive belt (not shown).

A first shaft 126 is connected to the second drive member 124 and the inner gimbal 118 for rotating the inner gimbal 118. A second shaft 128 is mounted in the inner gimbal 118 for supporting the gyro 120. The first shaft 126 is positioned substantially at a right angle θ relative to the second shaft 128.

A roller clutch 130 is mounted on the output shaft 114 so that the outer gimbal 116 is rotatable in only one direction Roller clutch 130 is commercially available as mentioned above.

The second drive member 124 is mounted on an outer peripheral surface 116a of outer gimbal 116. Also, a counterbalance member 132 is mounted on the outer gimbal 116 and positioned substantially opposite the second drive member 124 to counter the weight of the second drive member 124.

In FIG. 3, a gyro torque converter 210 includes an input shaft 212 fixedly connected to rotate a first drive member 222. An outer gimbal 216 is supported by the input shaft 212. A second drive member 224 is driven by the first drive member 222. An inner gimbal 218 is mounted within the outer gimbal 216. A gyro 220 is rotatably mounted within the inner gimbal 218 and an output shaft 214 is connected to rotate with the outer gimbal 216.

An intermediate drive means interconnects the first drive member 222 and the second drive member 224. The intermediate drive means includes a plurality of gears 223, 225, 227, 229 meshed between the first drive member 222 and the second drive member 224. It is recognized that other drive members can be interconnected by a drive belt (not shown). The plurality of gears includes bevel gears 225, 227, otherwise the embodiment of FIG. 3 is similar to the embodiment of FIG. 2.

A first shaft 226 is connected to the second drive member 224 and the inner gimbal 218 for rotating the inner gimbal 218. A second shaft 228 is mounted in the inner gimbal 218 for supporting the gyro 220. The first shaft 226 is positioned substantially at a right angle θ relative to the second shaft 228. A roller clutch 230, as discussed above, is also mounted on the output shaft 214.

In FIG. 4, a gyro torque converter 310 includes an input shaft 312 fixedly connected to rotate a first drive member 322. A gimbal 316 is supported by the input shaft 312. A second drive member 324 is driven by the first drive member 322. A gyro 320 is rotatably mounted within the gimbal 316 and an output shaft 314 is connected to rotate with the gimbal 316.

An intermediate drive means interconnects the first drive member 322 and the second drive member 324. The intermediate drive means includes a gear 323, meshed between the first drive member 322 and the second drive member 324. It is recognized that, instead of meshed gears, the drive members can be interconnected by a drive belt (not shown).

A first shaft 326 is connected to the second drive member 324 and the gimbal 316 for rotating the gyro 320 about shaft 326. Gyro 320 includes a commercially available drive unit 317 and a second shaft 328 extending from the drive unit 317 to drive a pair of rotating gyro members 321 when power is applied to drive unit 317. The first shaft 326 is positioned substantially at a right angle relative to the second shaft 328.

A roller clutch 330 is mounted on the output shaft 314 so that gimbal 316 is rotatable in only one direction. Roller clutch 330 is commercially available as mentioned above.

The second drive member 324 is mounted on an outer peripheral surface 316a of gimbal 316. Also, a counter-balance member 332 is mounted on the gimbal 316 and positioned substantially opposite the second drive member 324 to counter the weight of the second drive member 324.

Gimbal 316 is rotatable about the axis A of shafts 312, 314. Gyro 320 is rotatable about the axis B of shaft 326. Gyro members 321 are rotatable about the axis C of shaft 328. Power may be applied to drive unit 317 via a connection 325 to a power source 327.

The gyro used in the foregoing embodiments is preferably an electrically driven gyro that may be fabricated or may be commercially available. The gyro can be continuously rotated by an electric motor. Rotation of one of the two shafts (input shaft) produces a torque on the other shaft (output shaft). Power in one shaft can transfer power to a load on the other shaft. In one example, a steel gyro 4 inches in diameter and 3 inches long, rotating at 3700 rpm, and with the power input shaft rotating at 5200 rpm, will transmit about 180 horsepower to the output shaft.

As it can be seen, the principal advantages of these embodiments are that a non-complex, cost efficient gyro torque converter is provided which has practical uses such as, for example, in automobile transmissions.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A gyro torque converter comprising:
   an input shaft and an output shaft;
   a gimbal supported by the input shaft and the output shaft;
   a first shaft rotatably mounted to extend through the gimbal and connected to be driven by the input shaft;
   a second shaft;
   a gyro mounted to rotate on the first shaft and on the second shaft; and
   a roller clutch mounted on the output shaft so that the gimbal is rotatable in only one direction.

2. The torque converter as defined in claim 1 further comprising:
   a first drive member connected to rotate with the input shaft.

3. The torque converter as defined in claim 2 further comprising:
   a second drive member rotatably driven by the first drive member.

4. The torque converter as defined in claim 3 wherein the first shaft is connected to the second drive member.

5. The torque converter as defined in claim 4 wherein the first shaft is positioned at an angle relative to the second shaft, the angle being substantially 90 degrees.

6. The torque converter as defined in claim 3 wherein the second drive member is mounted on an outer peripheral surface of the gimbal and further comprising:
   a counter-balance mounted on the gimbal substantially opposite the second drive member.

7. A gyro torque converter comprising:
   an input shaft fixedly connected to rotate a first drive member;
   a gimbal supported by the input shaft;
   a second drive member mounted on an outer peripheral surface of the gimbal and driven by the first drive member;
   a first shaft driven by the second drive member;
   a drive unit mounted on the first shaft;
   a second shaft extending from the drive unit;
   a plurality of gyro members rotatably mounted on the second shaft;
   an output shaft connected to rotate with the gimbal; and
   a counter-balance mounted on the gimbal opposite the second drive member.

8. The torque converter as defined in claim 7 further comprising:
   an intermediate drive means interconnecting the first drive member and the second drive member.

9. The torque converter as defined in claim 8 wherein the first shaft is positioned substantially at a right angle relative to the second shaft.

10. The torque converter as defined in claim 8 further comprising:

a roller clutch mounted on the output shaft so that the gimbal is rotatable in only one direction.

11. The torque converter as defined in claim 8 wherein each drive member is a bevel gear.

12. A method of operating a gyro torque converter comprising:

fixedly connecting an input shaft to rotate a first drive member;

connecting a gimbal to be supported by the input shaft;

connecting a second drive member to be driven by the first drive member;

driving a first shaft by connection with the second drive member;

mounting a drive unit on the first shaft;

rotating the drive unit by means of the first shaft;

mounting a second shaft on the drive unit;

rotatably mounting a plurality of gyro members on the second shaft;

connecting an output shaft to rotate with the gimbal; and mounting a clutch on the output shaft so that the gimbal is rotatable in only one direction.

13. The method as defined in claim 12 further comprising:

positioning the first shaft at an angle relative to the second shaft, the angle being substantially at 90 degrees.

14. The method as defined in claim 12 further comprising:

connecting a power source to the drive unit for rotating the gyro members.

* * * * *